US010569163B2

(12) United States Patent
Hsueh et al.

(10) Patent No.: US 10,569,163 B2
(45) Date of Patent: Feb. 25, 2020

(54) SERVER AND METHOD FOR PROVIDING INTERACTION IN VIRTUAL REALITY MULTIPLAYER BOARD GAME

(71) Applicant: HON HAI PRECISION INDUSTRY CO., LTD., New Taipei (TW)

(72) Inventors: Kao-Chao Hsueh, New Taipei (TW); Hsiang-Yu Chen, New Taipei (TW); Wen-Chia Lee, New Taipei (TW); Hsien-Yi Chu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 1 day.

(21) Appl. No.: 15/980,820

(22) Filed: May 16, 2018

(65) Prior Publication Data

US 2019/0321721 A1 Oct. 24, 2019

(30) Foreign Application Priority Data

Apr. 18, 2018 (TW) .............................. 107113263 A

(51) Int. Cl.
| | |
|---|---|
| *A63F 9/00* | (2006.01) |
| *A63F 13/25* | (2014.01) |
| *A63F 13/573* | (2014.01) |
| *A63F 13/822* | (2014.01) |
| *A63F 13/235* | (2014.01) |
| *G06T 19/00* | (2011.01) |
| *H04L 29/06* | (2006.01) |

(52) U.S. Cl.
CPC ............ *A63F 13/25* (2014.09); *A63F 13/235* (2014.09); *A63F 13/573* (2014.09); *A63F 13/822* (2014.09); *G06T 19/003* (2013.01); *G06T 19/006* (2013.01); *A63F 2300/308* (2013.01); *A63F 2300/6607* (2013.01); *A63F 2300/69* (2013.01); *A63F 2300/8082* (2013.01); *H04L 67/38* (2013.01)

(58) Field of Classification Search
None
See application file for complete search history.

(56) References Cited

U.S. PATENT DOCUMENTS

| | | | | |
|---|---|---|---|---|
| 6,720,876 B1 * | 4/2004 | Burgess | ................ | G01S 5/0289 340/10.1 |
| 9,087,020 B1 * | 7/2015 | Amacker | .............. | G06F 16/958 |

(Continued)

FOREIGN PATENT DOCUMENTS

CN 103877726 A 6/2014

*Primary Examiner* — Seng H Lim
(74) *Attorney, Agent, or Firm* — ScienBiziP, P.C.

(57) ABSTRACT

A method to allow participation with multiple other players in a virtual reality (VR) board game includes steps of generating a board game scenario after a player with a mobile terminal logs in to a server and sending the VR scenario to the mobile terminal. The mobile terminal can transmit first and second signals, the first signal defining movement and track of a player piece being moved, and the second signal defining verbal expressions or commands by the player to trigger a preset event in the game. The first and second signals are analyzed and the player pieces in the VR scenario are moved accordingly. The method and system can also determine at least one player piece in the scenario that matches a condition for triggering a preset event or move in the VR game and make suggestions to the player accordingly.

14 Claims, 12 Drawing Sheets

(56) References Cited

U.S. PATENT DOCUMENTS

| | | | | |
|---|---|---|---|---|
| 9,227,135 B2* | 1/2016 | Hong | ................... | A63F 13/005 |
| 2001/0053691 A1* | 12/2001 | Harma | ................... | A63F 13/12 |
| | | | | 455/419 |
| 2007/0184886 A1* | 8/2007 | Floden | ............... | A63F 3/00094 |
| | | | | 463/14 |
| 2008/0012228 A1* | 1/2008 | Shideler | ................... | A63F 1/04 |
| | | | | 273/292 |
| 2009/0270183 A1* | 10/2009 | Lin | .................... | A63F 3/00643 |
| | | | | 463/43 |
| 2010/0113148 A1* | 5/2010 | Haltovsky | ............ | G06F 1/1626 |
| | | | | 463/30 |
| 2010/0156045 A1* | 6/2010 | Kahn | ................... | A63F 3/0423 |
| | | | | 273/153 R |
| 2011/0195763 A1* | 8/2011 | Kang | ............... | H04M 1/72544 |
| | | | | 463/6 |
| 2011/0216002 A1* | 9/2011 | Weising | ................... | G09G 5/08 |
| | | | | 345/158 |
| 2014/0113716 A1 | 4/2014 | Mukhopadhyay | | |
| 2014/0187334 A1* | 7/2014 | Crossley | ................ | A63F 13/44 |
| | | | | 463/43 |
| 2014/0243087 A1* | 8/2014 | Hong | ................... | A63F 13/005 |
| | | | | 463/31 |
| 2017/0326446 A1* | 11/2017 | Robbins | ............... | A63F 13/213 |
| 2018/0185744 A1* | 7/2018 | Veeramani | ......... | A63F 3/00895 |
| 2018/0285551 A1* | 10/2018 | Manning | ............ | A63F 3/00643 |
| 2019/0130049 A1* | 5/2019 | Jussila | .............. | G06F 16/90335 |
| 2019/0164344 A1* | 5/2019 | Potter | ..................... | B60Q 1/50 |

* cited by examiner

SERVER AND METHOD FOR PROVIDING INTERACTION IN VIRTUAL REALITY MULTIPLAYER BOARD GAME

FIELD

The subject matter herein generally relates to virtual reality (VR) board games, and more particularly, to a server and a method for providing interaction in a VR multiplayer board game.

BACKGROUND

VR is a computer-generated scenario that simulates a real experience. The environment can be similar to the real world or can be fantasy to create an experience not possible in our physical reality. VR technology is used in online games, but since a physical board game device and physical player pieces are not used, a player cannot enjoy tactile feedback in the game. Such feedback would bring a new level of tactile experience to the player.

Therefore, improvements in the art are preferred.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
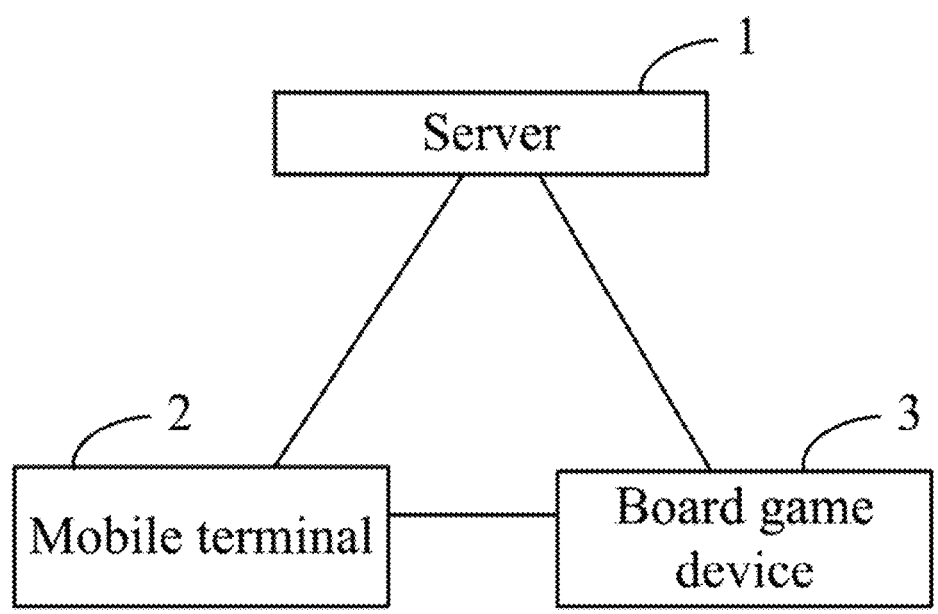
FIG. 1 illustrates a diagrammatic view of an application environment of an embodiment of a server for providing interaction in a VR multiplayer board game.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, referencing the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates an embodiment of a server 1 that can communicate with at least one mobile terminal 2. The mobile terminal 2 can be a smart phone, a tablet computer, or a personal data assistant (PDA).

Figure 2:
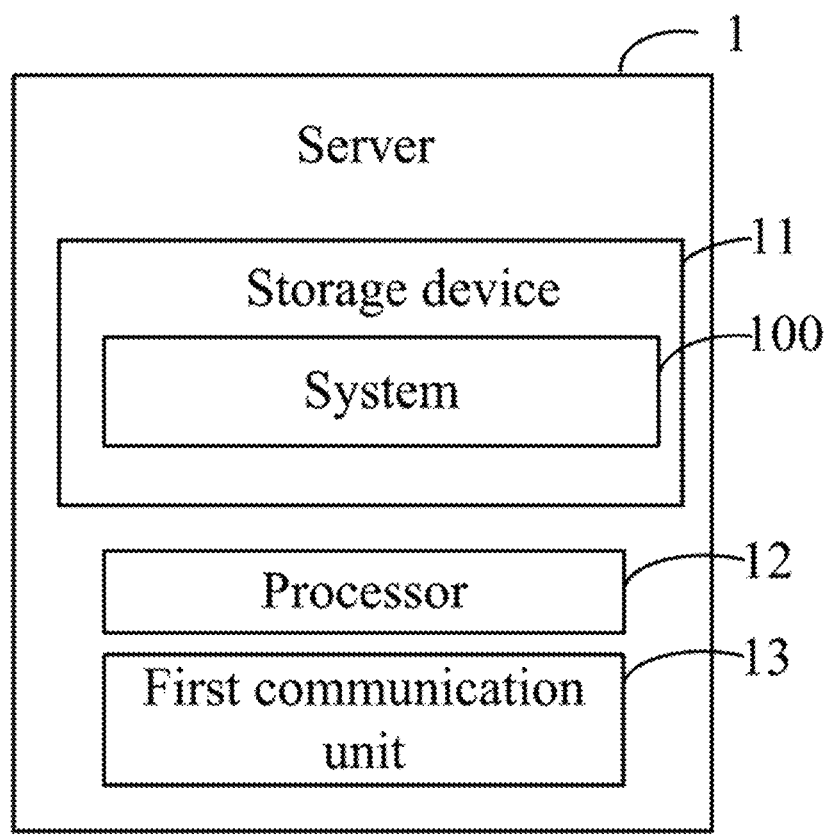
FIG. 2 illustrates a block diagram of the server of FIG. 1.

FIG. 2 illustrates that the server 1 comprises a storage device 11 and a processor 12. The storage device 11 stores a system 100 providing interaction in a virtual reality (VR) multiplayer board game. The system 100 comprises a number of modules, which are a collection of software instructions executable by the processor 12 to perform the functions of the system 100. In at least one embodiment, the storage device 11 can be an internal storage device built inside the server 1. In other embodiments, the storage device 11 can be an external storage device removably connected to the server 1. For example, the storage device 11 can be a smart media card, a secure digital card, or a flash card. The processor 12 can be a central processing unit, a microprocessor, or any other suitable chip having data processing function. In yet other embodiments, the storage device 11 can be located in a cloud or land-based server (not shown) accessible to the server 1 through any type of wireless communication systems.

Figure 3:
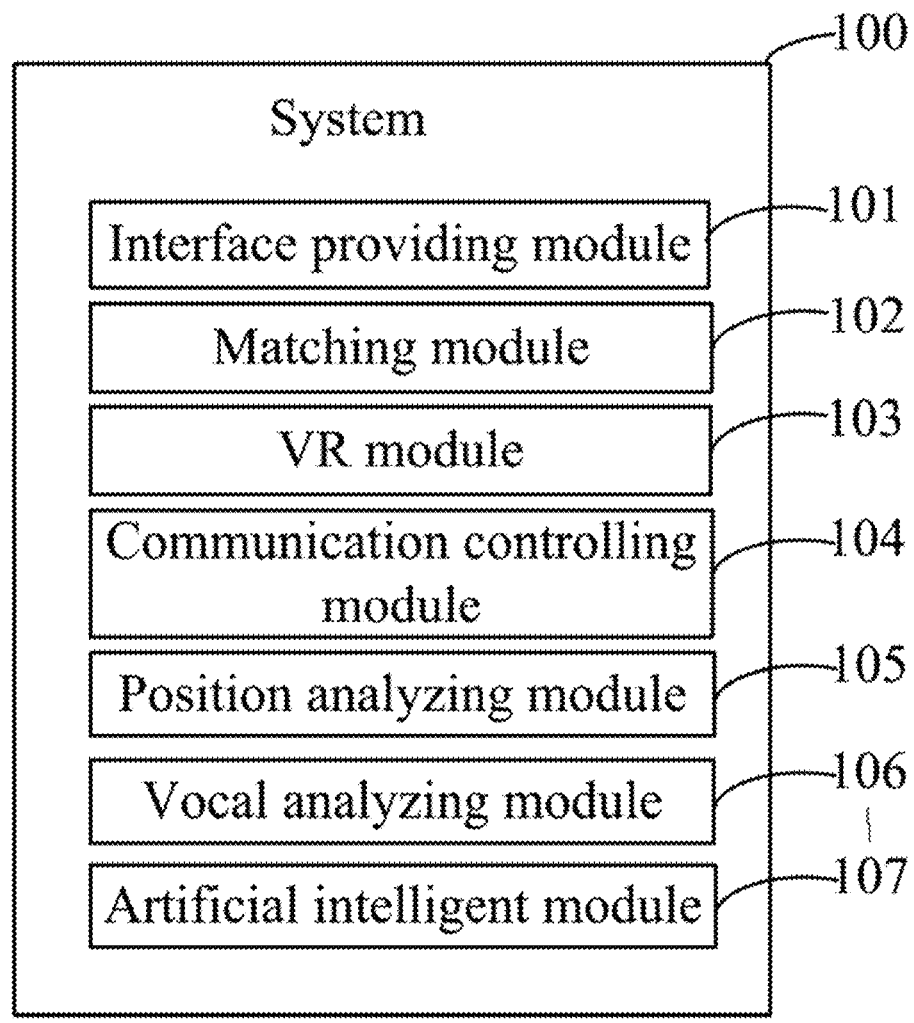
FIG. 3 illustrates a block diagram of a system for interacting in VR multiplayer board game included in the server of FIG. 2.

FIG. 3 illustrates that the system 100 comprises an interface providing module 101, a matching module 102, a VR module 103, a communication controlling module 104, a position analyzing module 105, and an vocal analyzing module 106.

Figure 4:
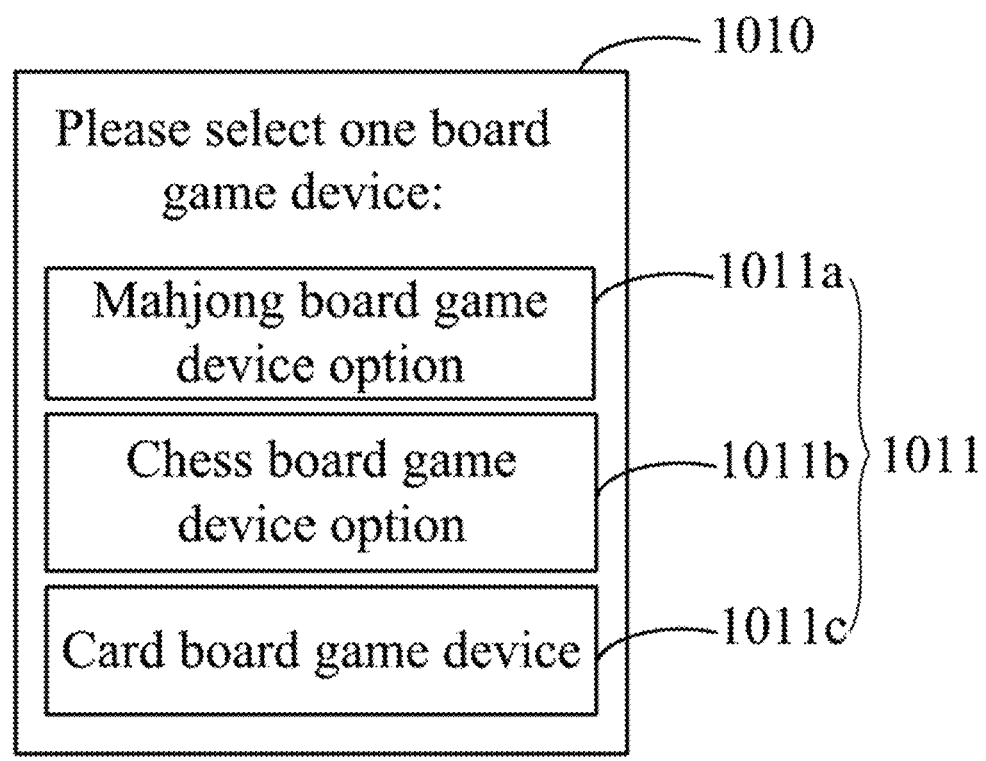
FIG. 4 illustrates a diagrammatic view of a game selection interface displayed by the system of FIG. 3.
Figure 5:
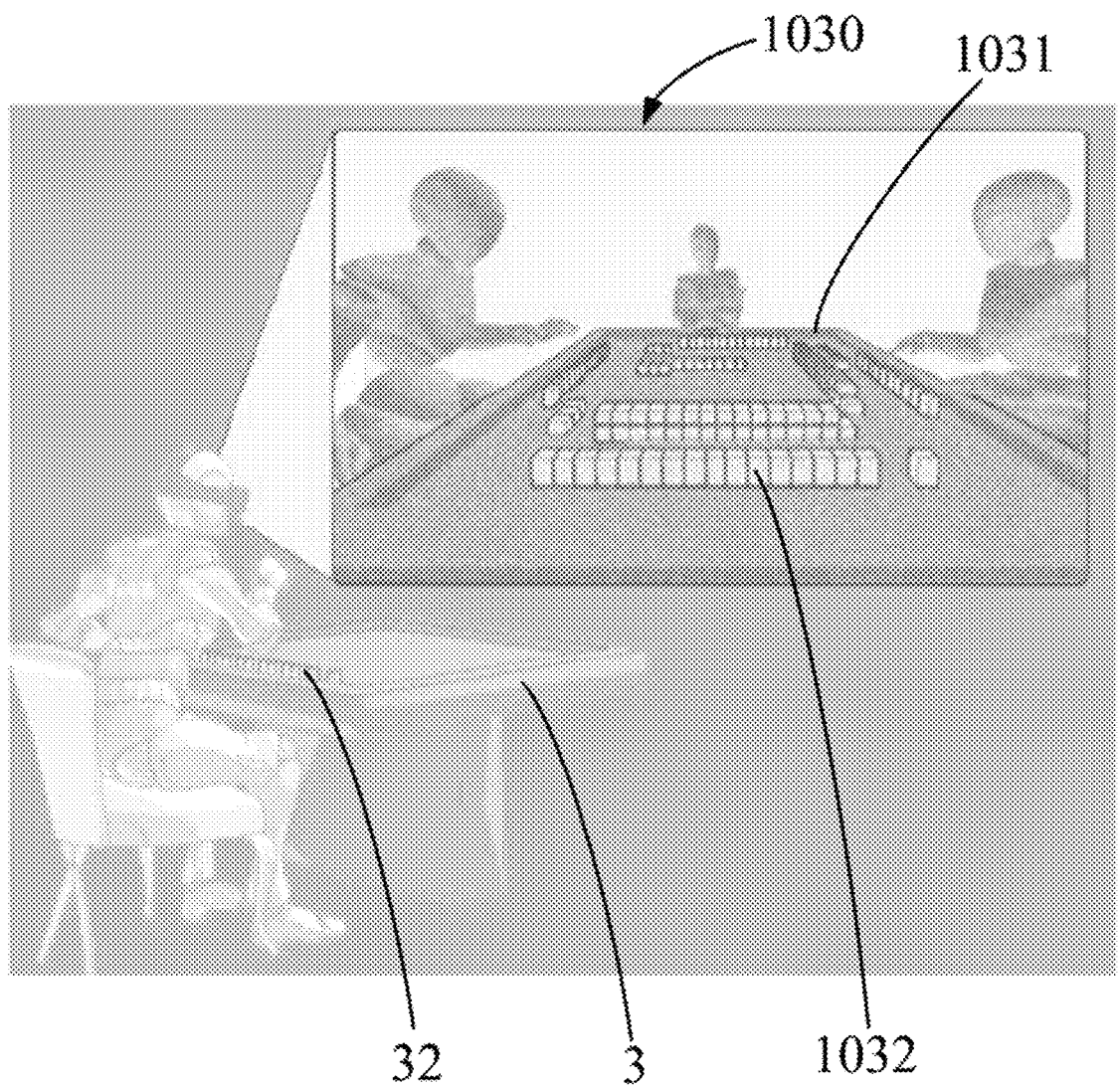
FIG. 5 illustrates a diagram of a virtual board game scene generated by the system of FIG. 3.

Referring to FIG. 4, when the mobile terminal 2 connects and logins to the server 1, the interface providing module 101 provides a game selection interface 1010 on a display screen 21 (shown in FIG. 8) of the mobile terminal 2. The game selection interface 1010 comprises at least two board game device options 1011 for the player to select. Each board game device option 1010 corresponds to one board game and to an appropriate board game device 3. The board game device 3 can be a physical board or other physical device appropriate for the game of mahjong, the game of chess, or games requiring playing cards. That is, the game selection interface 1010 can comprise a mahjong board game device option 1011a, a chess board game device option 1011b, and a card board game device 1011c. When a player wants to play mahjong, the player can use the smart phone to login to the server 1, and select the mahjong board game device option 1011a of the game selection interface 1010. The player can also make use of a board game device 3 to physically represent the state of play in the VR game. The player can sit beside his own board game device 3, and operate or play the cards or small objects (player pieces 32, shown in FIG. 7) appropriate for the board game device 3. For a mahjong board game device, the player pieces 32 are mahjong tiles, for a chess board game device the player pieces 32 are chess pieces, and for a card board game device the player pieces 32 are cards. Taking the mahjong games for example, operating or playing the player pieces 32 can include, but is not limited to, discarding a tile, claiming a tile to match a triplet (Pong), claiming a tile for a quadruplet (Kong), claiming a tile to match a sequence (Chow), or claiming a tile to win. The server 1 comprises a first communication unit 13. The mobile terminal 2 comprises a second communication unit 22 (see FIG. 8). Thus, the server 1 and the mobile terminal 2 can communicate with each other through the first communication unit 13 and the second communication unit 22. The first communication unit 13 and the second communication unit 22 each can be a wireless communication unit, for example, an RFID unit, an infrared unit, a BLUETOOTH unit, or a WI-FI unit.

When one board game device option 1010 of the game selection interface 1010 is selected, the matching unit 102 controls the server 1 to establish a connection with the board game device 3. The board game device 3 comprises a third communication unit 31 (see FIG. 7). Thus, the server 1 and the board game device 3 can communicate with each other through the first communication unit 13 and the third communication unit 31. The third communication unit 31 can also be a wireless communication unit.

Figure 6:
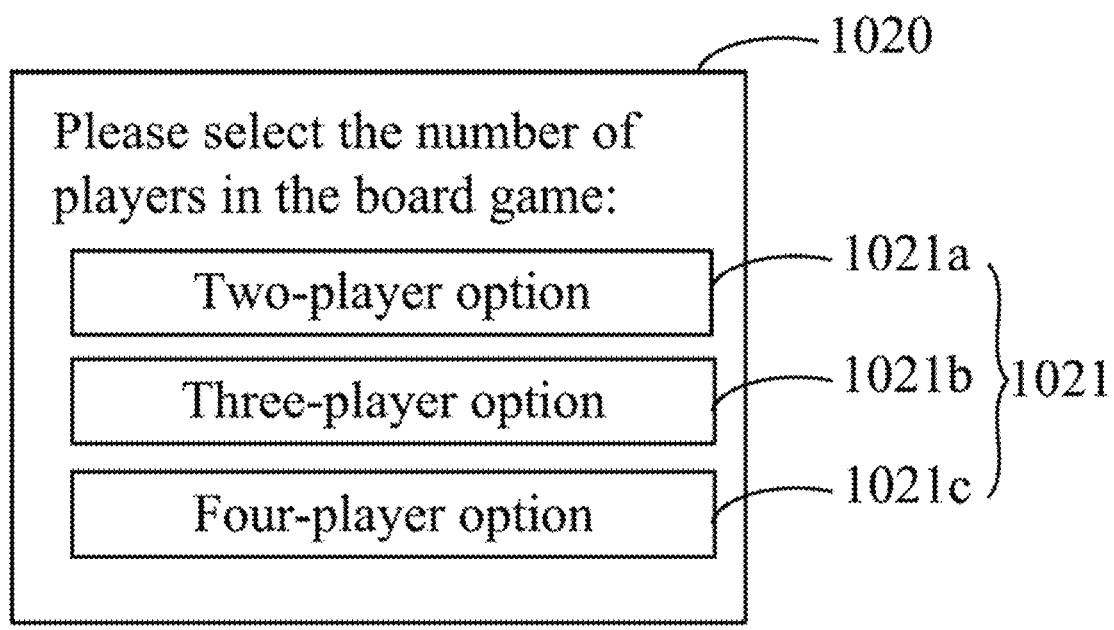
FIG. 6 illustrates a diagrammatic view of a player-number selection interface generated by the system of FIG. 3.

Referring to 5, after the server 1 establishes the connection with the board game device 3, the VR module 103 generates a virtual board game scene 1030 corresponding to the selected board game device option 1010. The virtual board game scene 1030 can show a three-dimensional virtual environment for the corresponding board game to the player. The three-dimensional virtual environment comprises a virtual board game device 1031, a plurality of virtual player pieces 1032, and other virtual players (opponents). For example, when the mahjong board game device option 1010a is selected, the three-dimensional virtual environment of the virtual board game scene 1030 comprises a virtual mahjong table, a plurality of virtual mahjong tiles, and three other virtual players. Referring to FIG. 6, in at least an embodiment, after the server 1 establishes the connection with the board game device 3, the matching module 102 provides a player-number selection interface 1020 on the display screen 21 of the mobile terminal 2. The player-number selection interface 1020 comprises at least two options (hereinafter, "player-number option") 1021 for number of players in the board game selectable by the player. Each player-number option 1021 corresponds to the number of players. For example, the player-number options 1021 can comprise a two-player option 1021a, a three-player option 1021b, and a four-player option 1021c. The VR module 103 generates the virtual board game scene 1030 only when the total number of players who connect and login to the server 1 through their own mobile terminals 2 matches the selected player-number option 1021.

Figure 7:
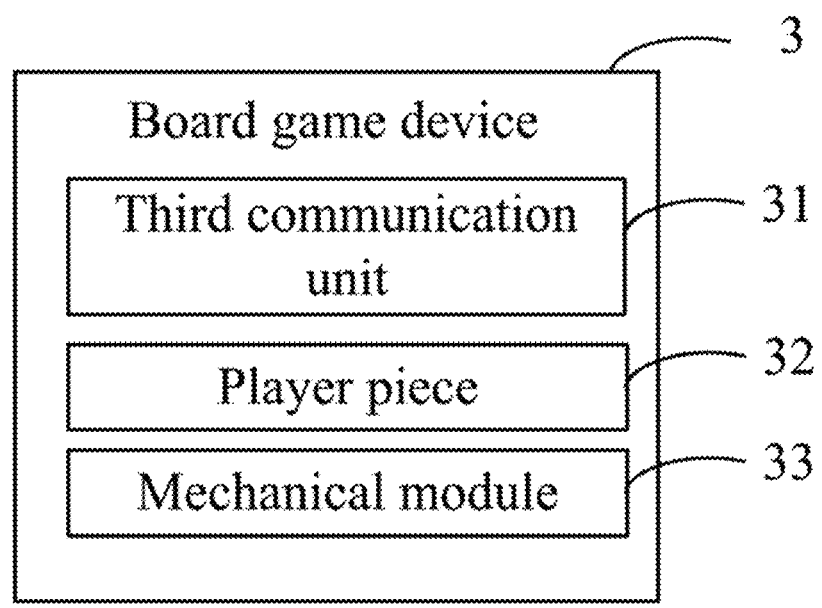
FIG. 7 illustrates a block diagram of a board game device in the environment of FIG. 1.
Figure 8:
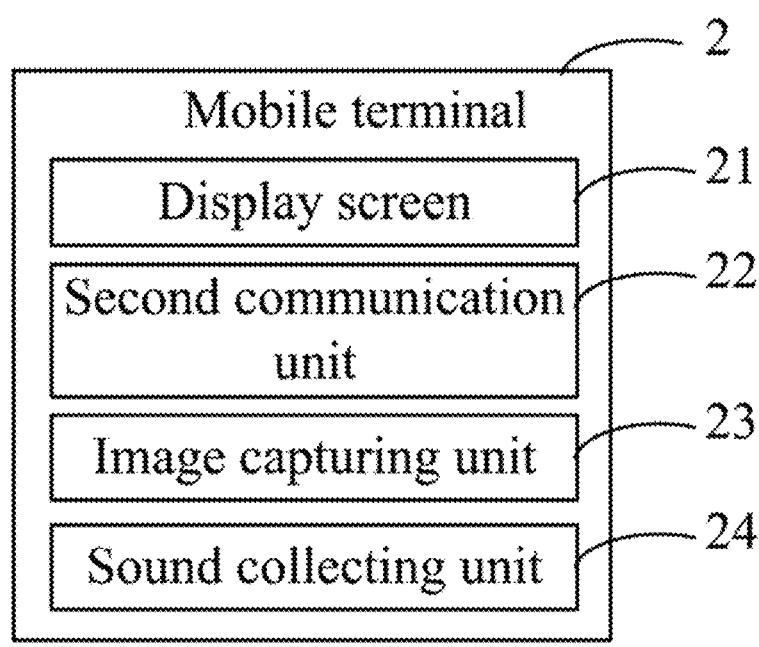
FIG. 8 illustrates a block diagram of a mobile terminal in the environment of FIG. 1.

The communication controlling module 104 sends the virtual board game scene 1030 to the mobile terminal 2 through the first communication unit 13, thereby allowing the mobile terminal 2 to display the virtual board game scene 1030 on the display screen 21. In actual use, the player can place his mobile terminal 2 on a VR headset (not shown) and wear the VR headset containing the mobile terminal 2. Then, the player can start to operate the player pieces 32 and participate and take part in the board game. Referring to FIG. 7, the communication controlling module 104 further sends a moving command to the board game device 3 through the first communication unit 13. The moving command is configured to control a mechanical module 33 of the board game device 3 to move the player pieces 32 to a preset position for the player, thereby facilitating the operation of the player pieces 32.

The mobile terminal 2 further comprises an image capturing unit 23 and a sound collecting unit 24.

The image capturing unit 23 captures a plurality of successive images within its field of view and generates a first signal accordingly. Each image comprises a sub-image of the player piece 32 being operated by the player. Thus, when the player operates or moves the player piece 32, the image capturing unit 23 can capture the images of the player piece 32 being operated, and the images can show an actual moving trajectory of the player piece 32 being operated. In at least one embodiment, the image capturing unit 23 is a camera.

The sound collecting unit 24 collects sound from ambient environment and generates a second signal accordingly. The second signal comprises a vocal instruction of the player for triggering a preset movement or event. For example, when the current state of the player pieces 32 (that is, the remaining mahjong tiles) matches a condition for enabling at least one preset event (in mahjong games for example, the preset event can include, but is not limited to, the aforementioned Pong, Kong, or Chow), the player can audibly express one preset event, and such an audible expression by the player can be collected by the sound collecting unit 24. In at least one embodiment, the sound collecting unit 24 is a microphone.

The second communication unit 22 sends the first signal and the second signal to the server 1.

The communication controlling module 14 receives the first signal and the second signal from the mobile terminal 2 through the first communication unit 13.

The position analyzing module 105 analyzes the first signal to determine a virtual moving trajectory of a corresponding virtual player piece 1032 in the virtual board game scene 1030. In at least an embodiment, the position analyzing module 105 determines a same reference or anchor point in each image (for example, a corner of the board game device 3), determines an initial position of the player piece 32 being operated relative to the reference point in each image, determines a position of the reference point in the virtual board game scene 1030, and determines a finishing position of the corresponding virtual player piece 1032 in the virtual board game scene 1030 accordingly. The finishing positions of the virtual player piece 1032 then form the virtual moving trajectory in the virtual board game scene 1030. In another embodiment, the board game device 3 itself can detect the positions of player pieces 32 being operated by identification technologies, and transmit such positions to the server 1 through the third communication unit 31. Thus, the position analyzing module 105 can determine the virtual moving trajectory of the virtual player pieces 1032 in the virtual board game scene 1030.

The VR module 103 further moves the virtual player piece 1032 in the virtual board game scene 1030 according to the virtual moving trajectory, thereby simulating the actual moving trajectory of the player piece 32 being operated. For example, when the player discards a second mahjong tile, the VR module 103 moves the second virtual mahjong tile in the virtual board game scene 1030 accordingly, to simulate the actual process of discarding the tile.

The vocal analyzing module 106 analyzes the second signal to obtain the vocal instruction of the player, and generates a control command according to the vocal instruction. Since noises may exist in the sound signals, the vocal analyzing module 106 processes the second signal by noise reduction, thus obtaining the correct vocal expression.

The VR module 103 further determines at least one virtual player piece 1032 in the virtual board game scene 1030 that matches the condition for triggering the preset event included in control command, and controls the determined virtual player piece 1032 to perform corresponding actions in the virtual board game scene 1030, thereby simulating the triggering process of the preset event. For example, when the player shouts "claiming a tile to match a triplet!", the VR module 103 controls the virtual mahjong tile discarded by the opponent and a pair of virtual mahjong tiles of the player to form a triplet. In at least an embodiment, each time the virtual player piece 1032 in the virtual board game scene 1030 is operated or the preset event is triggered, the VR module 103 determines the operation of the virtual player piece 1032 or the triggering of the preset event as a past event, and stores the past event in the storage device 11 with a time stamp.

In at least an embodiment, the system 100 further comprises an artificial intelligent module 107.

Figure 9:
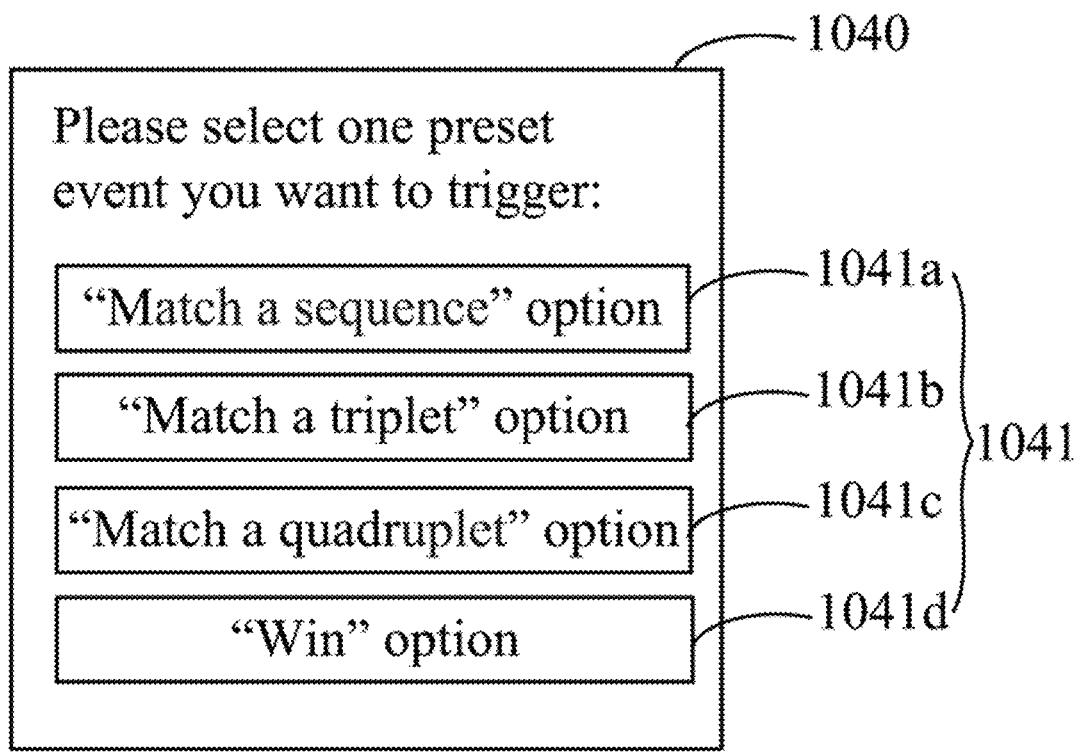
FIG. 9 is a diagrammatic view of an event selection interface generated by the system of FIG. 3.

When it is the player's turn to operate the player pieces 32, the artificial intelligent module 107 can analyze the past events stored in the storage device 11 to determine at least one preset event that can currently be triggered, and generates an event selection command according to the determined preset event. The communication control module 104 further sends the event selection command to the mobile terminal 2 through the first communication unit 13. Referring to FIG. 9, the event selection command is configured to control the mobile terminal 2 to display an event selection interface 1040 on the display screen 21. The event selection interface 1040 comprises at least one preset event option 1041 for the player to select. Each preset event option 1041 corresponds to one preset event that can currently be triggered. For example, the operation selection interface 1040 can comprise a "match a sequence" option 1041*a*, a "match a triplet" option 1041*b*, a "match a quadruplet" option 1041*c*, and a "win" option 1041*d*. The player can audibly select one preset event option 1041, and the audible expression can be collected by the sound collecting unit 24.

Figure 10:
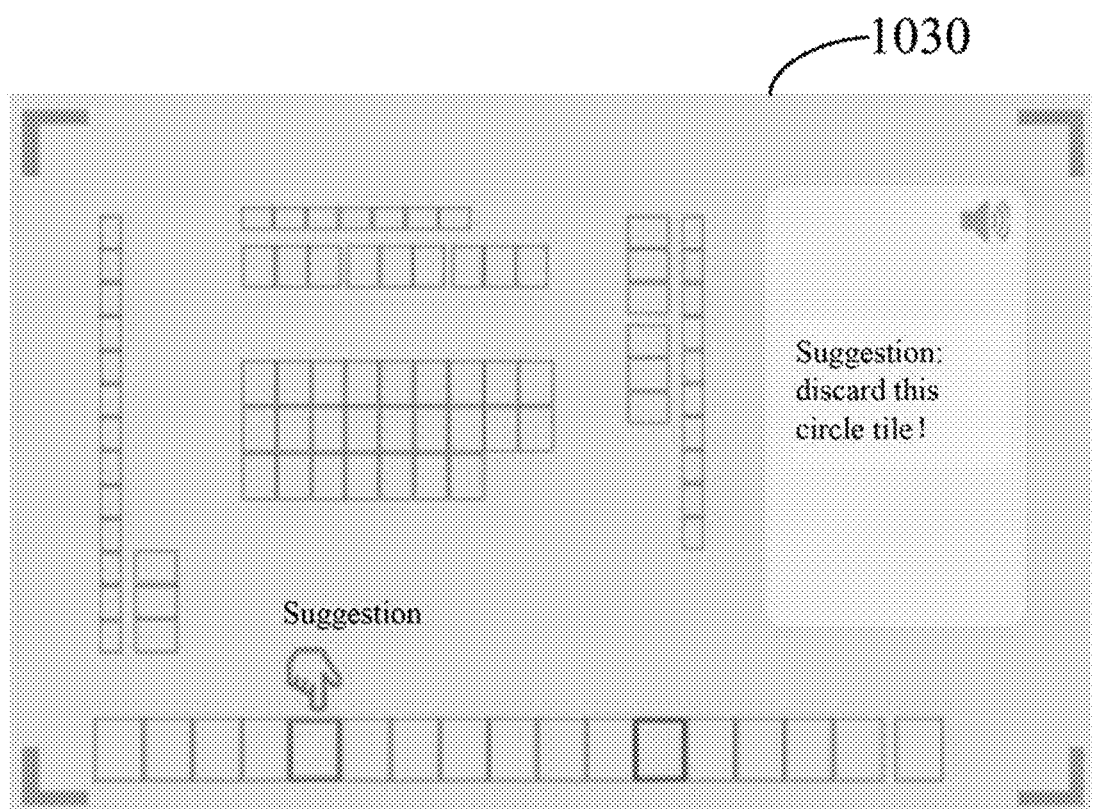
FIG. 10 is a diagrammatic view of a suggestion for suggesting player operation generated by the system of FIG. 3.

When it is the player's turn to operate the player pieces 32, the artificial intelligent module 107 further analyzes the past events stored in the storage device 11 to generate a suggestion comprising a suggested operation. Referring to FIG. 10, in at least an embodiment, the VR module 103 adds the suggestion to the virtual board game scene 1030. The artificial intelligent module 107 comprises a number of artificial intelligent models, and each artificial intelligent model is for one type of board game. Thus, the artificial intelligent module 107 can generate the suggestion corresponding to each type of board game. The artificial intelligent module 107 further stores the suggestion in the storage device with a time stamp.

In at least an embodiment, the artificial intelligent module 107 further analyzes the past events stored in the storage device 11 by Q-learning to generate a scoring table. The scoring table comprises the current state of the player pieces 32, a plurality of executable operations, an expected state for each executable operation, and a reward value for each expected state. The artificial intelligent module 107 further compares different reward values in the scoring table to determine an executable operation with a highest reward value, and treats the determined executable operation as the suggested operation. The suggestion is then generated by the suggested operation. The scoring table is shown in table 1.

TABLE 1

| Executable operations | | Current state of the player pieces | | | |
|---|---|---|---|---|---|
| | | Tile 1 | Tile 2 | ... | Tile 17 |
| Draw and discard | Expected state | | Form a meld | ... | Opponent win |
| | Reward value | 0 | +10 | | −500 |
| Chow and discard | Expected state | Waiting for the one necessary tile to win | | ... | Opponent draw |
| | Reward value | +100 | 0 | | −20 |
| Pong and discard | Expected state | Form all triplets | Form all of one suit | ... | Form all triplets |
| | Reward value | +50 | +30 | | +50 |
| Kong and discard | Expected state | Opponent win | Grand 3 chiefs | ... | Opponent draw |
| | Reward value | −500 | +100 | | −20 |

In at least an embodiment, the artificial intelligent module 107 further determines whether the actual operation or movement made by the player is the same as the suggested operation in the suggestion. If the actual operation is different from the suggested operation, the artificial intelligent module 107 determines the expected state for the actual operation, and determines the reward value for the expected state. When the reward value is less than a certain preset reward value, the artificial intelligent module 107 determines that the actual operation is an erroneous operation, adds the erroneous operation to a learning report that is in a form of audio, text, or image, and outputs the learning report to the mobile terminal 2 when the current game ends. The player can thus be reminded of a serious mistake. The artificial intelligent module 107 further stores the learning report in the storage device 11.

Furthermore, when a next game begins, the artificial intelligent module 107 can further continue to determine whether an actual operation made by the player is an erroneous operation. When the actual operation is an erroneous operation, the artificial intelligent module 107 determines whether the inaccurate operation already exists in the learning report stored in the storage device 11 (that is, whether such error is repeated). When such error is found to be repeated, by reference to the learning report, the VR module 103 directly generates a tip on the virtual board game scene 1030, reminding the player that the same mistake has occurred before.

Furthermore, when the current game ends, the artificial intelligent module 107 establishes a learning model according to the past events and the suggestions stored in the storage device 11, to simulate an operation process during a current or next game. Thus, the player can repeatedly practice until each actual operation of the player approaches the suggested operations in the suggestions.

Figure 11:
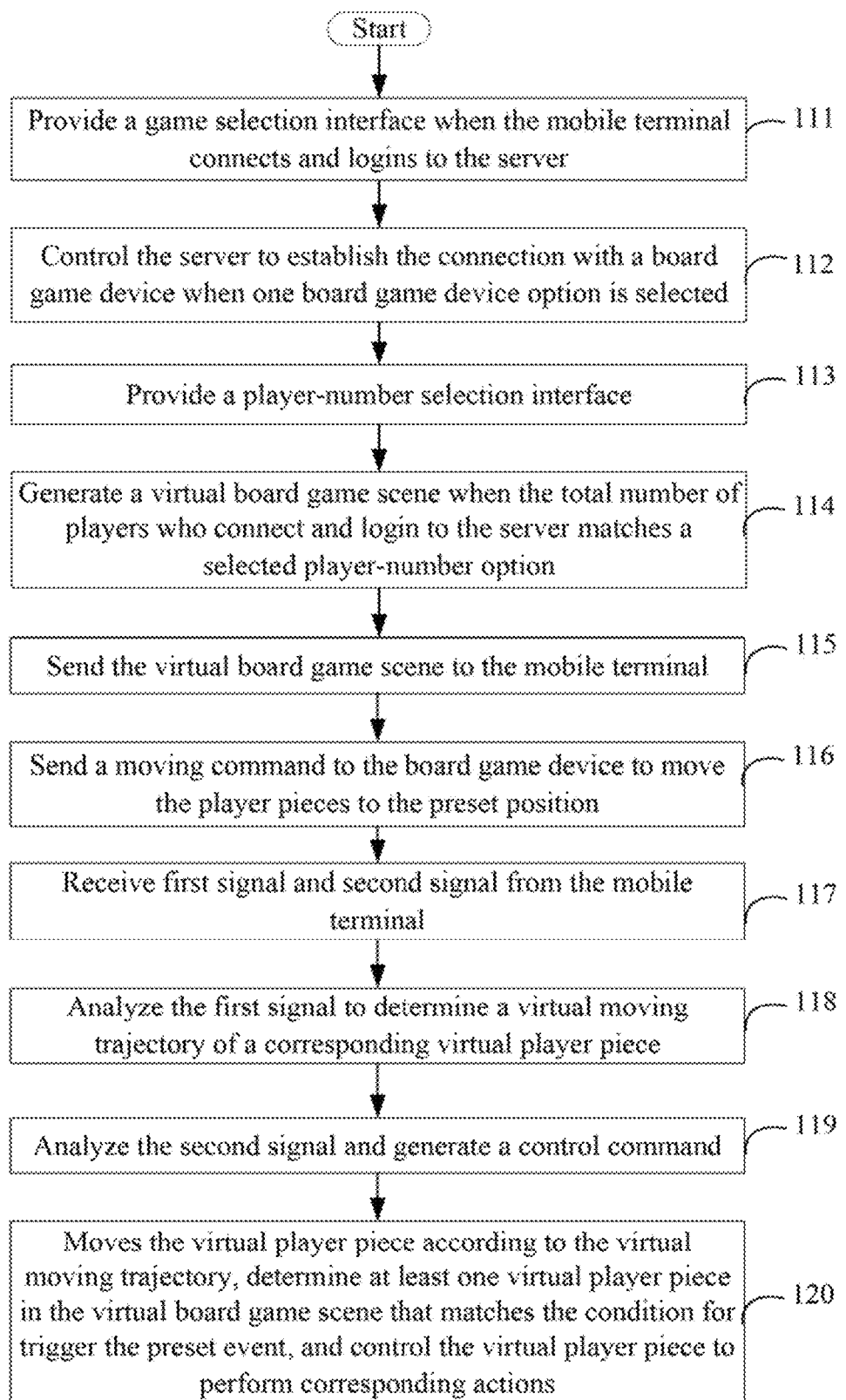
FIG. 11 illustrates a flowchart of an embodiment of a method for providing interaction in a VR multiplayer board game.

FIG. 11 illustrates an embodiment of a method for providing interactions in a VR multiplayer board game. The method is provided by way of example, as there are a variety of ways to carry out the method. The method described below can be carried out using the configurations illustrated in FIGS. 1-10, for example, and various elements of these figures are referenced in explaining example method. Each block shown in FIG. 3 represents one or more processes, methods, or subroutines, carried out in the example method. Furthermore, the illustrated order of blocks is illustrative only and the order of the blocks can change. Additional blocks can be added or fewer blocks may be utilized or the order of the blocks may be changed, without departing from this disclosure. The example method can begin at block 111.

At block 111, the interface providing module 101 provides the game selection interface 1010 on the display screen 21 of the mobile terminal 2 when the mobile terminal 2 connects and logins to the server 1. The game selection interface 1010 comprises at least two board game device options 1011 for the player to select. Each board game device option 1010 corresponds to one board game and to an appropriate board game device 3.

At block 112, the matching unit 102 controls the server 1 to establish the connection with the board game device 3 when one board game device option 1010 of the game selection interface 1010 is selected.

At block 113, the matching module 102 provides the player-number selection interface 1020 on the display screen 21 of the mobile terminal 2. The player-number selection interface 1020 comprises at least two player-number options 1021 for number of players in the board game selectable by the player. Each player-number option 1021 corresponds to the number of players.

At block 114, the VR module 103 generates the virtual board game scene 1030 corresponding to the selected board game device option 1010 when the total number of players who connect and login to the server 1 through their own mobile terminals 2 matches the selected player-number option 1021.

At block 115, the communication controlling module 104 sends the virtual board game scene 1030 to the mobile terminal 2 through the first communication unit 13, thereby allowing the mobile terminal 2 to display the virtual board game scene 1030 on the display screen 21.

At block 116, the communication controlling module 104 further sends the moving command to the board game device 3 through the first communication unit 13. The moving command is configured to control the mechanical module 33 of the board game device 3 to move the player pieces 32 to the preset position for the player, thereby facilitating the operation of the player pieces 32.

At block 117, the communication controlling module 14 receives the first signal and the second signal from the mobile terminal 2 through the first communication unit 13. The first signal is generated by a plurality of successive images captured by the image capturing unit 23 of the mobile terminal 2 within its field of view. Each image comprises a sub-image of the player piece 32 being operated by the player. The second signal is generated by sound from ambient environment collected by the sound collecting unit 24. The second signal comprises the vocal instruction of the player for triggering a preset movement or event.

At block 118, the position analyzing module 105 analyzes the first signal to determine the virtual moving trajectory of a corresponding virtual player piece 1032 in the virtual board game scene 1030.

At block 119, the vocal analyzing module 106 analyzes the second signal to obtain the vocal instruction of the player, and generates the control command according to the vocal instruction.

At block 120, the VR module 103 moves the virtual player piece 1032 in the virtual board game scene 1030 according to the virtual moving trajectory, thereby simulating the actual moving trajectory of the player piece 32 being operated. The VR module 103 further determines at least one virtual player piece 1032 in the virtual board game scene 1030 that matches the condition for triggering the preset event included in control command, and controls the determined virtual player piece 1032 to perform corresponding actions in the virtual board game scene 1030, thereby simulating the triggering process of the preset event. Each time the virtual player piece 1032 in the virtual board game scene 1030 is operated or the preset event is triggered, the VR module 103 can determine the operation of the virtual player piece 1032 or the triggering of the preset event as a pass event, and store the pass event in the storage device 11 with a time stamp.

Figure 12:
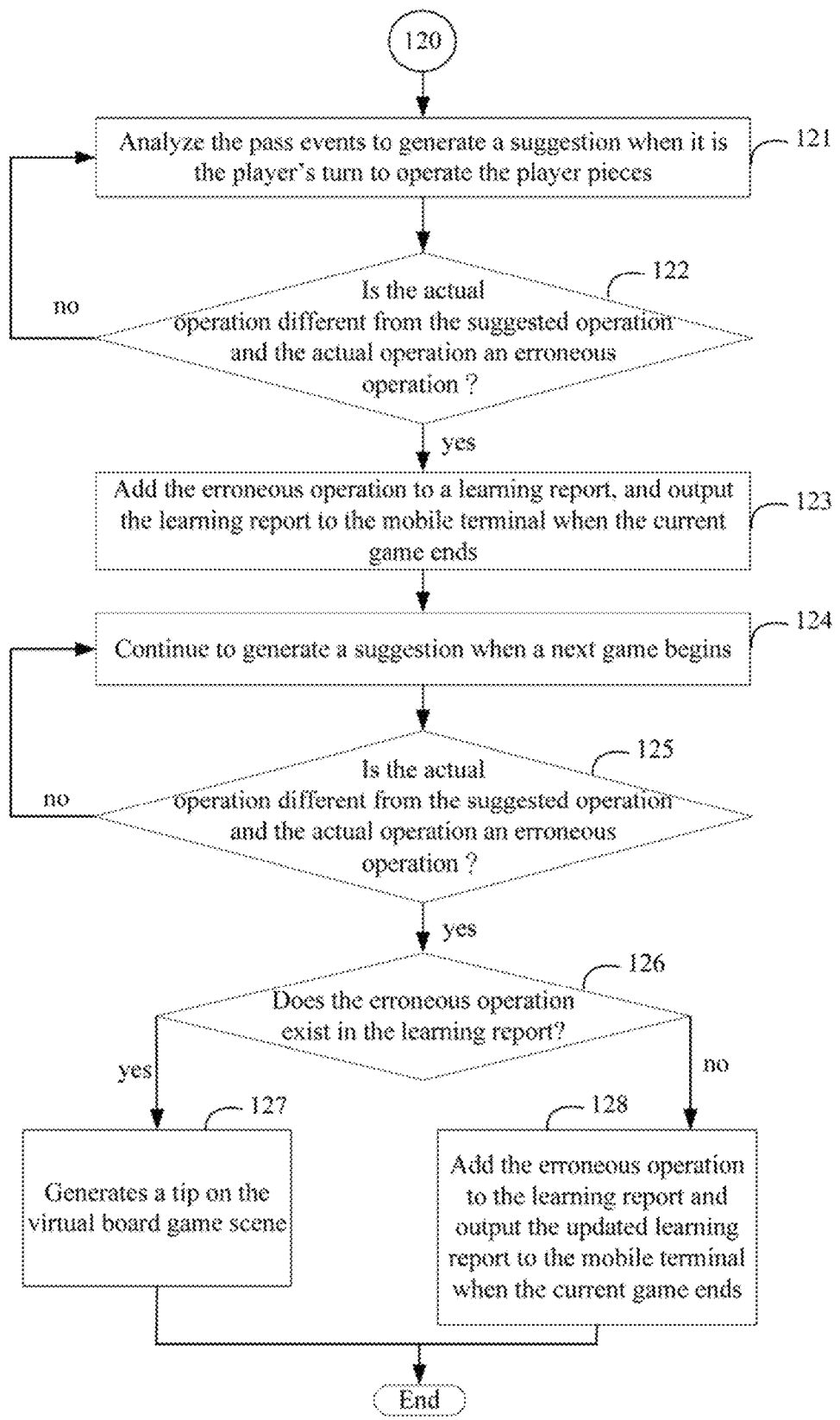
FIG. 12 illustrates a flowchart of a sub-method to follow block 120 of the method of FIG. 11.

Referring to FIG. 12, in at least an embodiment, the method further comprises additional blocks after the block 120.

At block 121, the artificial intelligent module 107 analyzes the pass events stored in the storage device 11 to generate a suggestion when it is the player's turn to operate the player pieces 32, and the suggestion comprising a suggested operation.

At block 122, the artificial intelligent module 107 determines whether the actual operation of the player is different from the suggested operation and the actual operation is an erroneous operation. If yes, the procedure goes to block 123; otherwise, block 121 is repeated.

At block 123, the artificial intelligent module 107 adds the erroneous operation to a learning report, and outputs the learning report to the mobile terminal 2 when the current game ends. The player can thus be reminded of a serious mistake. The artificial intelligent module 107 further stores the learning report in the storage device 11.

At block 124, the artificial intelligent module 107 continues to generate a suggestion when a next game begins.

At block 125, the artificial intelligent module 107 determines whether the actual operation of the player is different from the suggested operation in the suggestion and the actual operation is an erroneous operation. If yes, the procedure goes to block 126; otherwise, block 124 is repeated.

At block 126, the artificial intelligent module 107 determines whether the erroneous operation already exists in the learning report stored in the storage device 11. If yes, the procedure goes to block 127; otherwise, the procedure goes to block 128.

At block 127, the VR module 103 directly generates a tip on the virtual board game scene 1030, reminding the player that the same mistake has occurred before.

At block 128, the artificial intelligent module 107 adds the erroneous operation to the learning report to update the learning report, and outputs the updated learning report to the mobile terminal 2 when the current game ends.

With the above configuration, the user can enjoy the virtual board game scene 1030 and the tactile feedback provided by the board game device 3 during gaming. Thus, a new level of tactile experience can be brought to the player. Furthermore, the user can learn more skills for playing the board game better by the suggestions and the learning report provided by the server 1.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A server for providing interaction in a virtual reality multiplayer board game, comprising:
   a processor; and
   a storage device coupled to the processor and storing one or more programs to be executed by the processor, wherein when executed by the processor, the one or more programs cause the processor to:
   generate a virtual board game scene after a mobile terminal connects and logins to the server;
   send the virtual board game scene to the mobile terminal;
   receive a first signal and a second signal from the mobile terminal, the first signal showing an actual moving trajectory of a player piece being operated, the second signal comprising a vocal instruction for triggering a preset event;
   analyze the first signal to determine a virtual moving trajectory of a corresponding virtual player piece in the virtual board game scene, move the determined virtual player piece according to the virtual moving trajectory, thereby simulating the actual moving trajectory of the player piece being operated;
   analyze the second signal to obtain the vocal instruction, generate a control command according to the vocal instruction, determine at least one virtual player piece in the virtual board game scene that matches a condition for triggering the preset event included in control command, and control the determined virtual player piece to perform corresponding actions in the virtual board game scene, thereby simulating a triggering process of the preset event;
   each time the virtual player piece in the virtual board game scene is operated or the preset event is triggered, determine the operation of the virtual player piece or the triggering of the preset event as a pass event;
   store the pass event in the storage device with a time stamp;
   analyze the past events stored in the storage device to determine at least one preset event that can currently be triggered when it is the player's turn to operate the player pieces;
   generate an event selection command according to the determined preset event; and
   send the event selection command to the mobile terminal, the event selection command configured to control the mobile terminal to display an event selection interface, the event selection interface comprising at least one preset event option for the player to audibly select, each preset event option corresponding to one preset event that can currently be triggered;
   wherein the past events stored in the storage device is analyzed by Q-learning to generate a scoring table, the scoring table comprises a current state of the player pieces, a plurality of executable operations, an expected state for each executable operation, and a reward value for each expected state, different reward values in the scoring table are compared to determine an executable operation with a highest reward value, the determined executable operation is treated as the suggested operation, the suggestion is then generated by the suggested operation.

2. The server of claim 1, wherein the one or more programs further cause the processor to:
   provide a game selection interface on the mobile terminal when the mobile terminal connects and logins to the server, the game selection interface comprising at least two board game device options, each board game device option corresponding to one board game and to an appropriate board game device; and
   control the server to establish a connection with the board game device when one board game device option is selected, the board game device corresponding to the selected board game device option.

3. The server of claim 2, wherein the one or more programs further cause the processor to:
   send a moving command to the board game device, the moving command configured to control the board game device to move the player pieces to a preset position.

4. The server of claim 2, wherein after the server establishes the connection with the board game device, the one or more programs further cause the processor to:
   provide a player-number selection interface on the mobile terminal, the player-number selection interface comprising at least two player-number option, each player-number option corresponding to the number of players;
   wherein the virtual board game scene is generated only when a total number of players who connect and login to the server matches a selected player-number option.

5. The server of claim 1, wherein the one or more programs further cause the processor to:
   analyze the past events stored in the storage device to generate a suggestion when it is the player's turn to operate the player pieces, the suggestion comprising a suggested operation.

6. The server of claim 1, wherein the one or more programs further cause the processor to:
   determine whether an actual operation made by the player is the same as the suggested operation in the suggestion;
   determine the expected state for the actual operation when the actual operation is different from the suggested operation, and determine the reward value for the expected state;
   determine that the actual operation is an erroneous operation when the reward value is less than a preset reward value, add the erroneous operation to a learning report, and output the learning report to the mobile terminal when the current game ends; and
   store the learning report in the storage device.

7. The server of claim 6, wherein the one or more programs further cause the processor to:
   continue to determine whether an actual operation made by the player is an erroneous operation when a next game begins;

determine whether the inaccurate operation already exists in the learning report stored in the storage device when the actual operation is an erroneous operation; and directly generates a tip on the virtual board game scene when the inaccurate operation already exists in the learning report.

8. A method for providing interaction in a virtual reality multiplayer board game applied in a server, the method comprising:

generating a virtual board game scene after a mobile terminal connects and logins to the server;

sending the virtual board game scene to the mobile terminal;

receiving a first signal and a second signal from the mobile terminal, the first signal showing an actual moving trajectory of a player piece being operated, the second signal comprising a vocal instruction for triggering a preset event;

analyzing the first signal to determine a virtual moving trajectory of a corresponding virtual player piece in the virtual board game scene, moving the determined virtual player piece according to the virtual moving trajectory, thereby simulating the actual moving trajectory of the player piece being operated; and analyzing the second signal to obtain the vocal instruction, generating a control command according to the vocal instruction, determining at least one virtual player piece in the virtual board game scene that matches a condition for triggering the preset event included in control command, and controlling the determined virtual player piece to perform corresponding actions in the virtual board game scene, thereby simulating a triggering process of the preset event;

each time the virtual player piece in the virtual board game scene is operated or the preset event is triggered, determining the operation of the virtual player piece or the triggering of the preset event as a pass event;

storing the pass event in the storage device with a time stamp;

analyzing the past events stored in the storage device to determine at least one preset event that can currently be triggered when it is the player's turn to operate the player pieces;

generating an event selection command according to the determined preset event; and sending the event selection command to the mobile terminal, the event selection command configured to control the mobile terminal to display an event selection interface, the event selection interface comprising at least one preset event option for the player to audibly select, each preset event option corresponding to one preset event that can currently be triggered;

wherein the past events stored in the storage device is analyzed by Q-learning to generate a scoring table, the scoring table comprises a current state of the player pieces, a plurality of executable operations, an expected state for each executable operation, and a reward value for each expected state, different reward values in the scoring table are compared to determine an executable operation with a highest reward value, the determined executable operation is treated as the suggested operation, the suggestion is then generated by the suggested operation.

9. The method of claim 8, further comprising:

providing a game selection interface on the mobile terminal when the mobile terminal connects and logins to the server, the game selection interface comprising at least two board game device options, each board game device option corresponding to one board game and to an appropriate board game device; and controlling the server to establish a connection with the board game device when one board game device option is selected, the board game device corresponding to the selected board game device option.

10. The method of claim 9, further comprising:

sending a moving command to the board game device, the moving command configured to control the board game device to move the player pieces to a preset position.

11. The method of claim 9, further comprising:

providing a player-number selection interface on the mobile terminal, the player-number selection interface comprising at least two player-number option, each player-number option corresponding to the number of players;

wherein the virtual board game scene is generated only when a total number of players who connect and login to the server matches a selected player-number option.

12. The method of claim 8, further comprising:

analyzing the past events stored in the storage device to generate a suggestion when it is the player's turn to operate the player pieces, the suggestion comprising a suggested operation.

13. The method of claim 8, further comprising:

determining whether an actual operation made by the player is the same as the suggested operation in the suggestion;

determining the expected state for the actual operation when the actual operation is different from the suggested operation, and determine the reward value for the expected state;

determining that the actual operation is an erroneous operation when the reward value is less than a preset reward value, add the erroneous operation to a learning report, and output the learning report to the mobile terminal when the current game ends; and storing the learning report in the storage device.

14. The method of claim 13, further comprising:

continuing to determine whether an actual operation made by the player is an erroneous operation when a next game begins;

determining whether the inaccurate operation already exists in the learning report stored in the storage device when the actual operation is an erroneous operation; and directly generating a tip on the virtual board game scene when the inaccurate operation already exists in the learning report.

* * * * *